US008990606B2

(12) United States Patent
Turullols et al.

(10) Patent No.: US 8,990,606 B2
(45) Date of Patent: Mar. 24, 2015

(54) CONSTANT FREQUENCY ARCHITECTURAL TIMER IN A DYNAMIC CLOCK DOMAIN

(75) Inventors: Sebastian Turullols, Los Altos, CA (US); Ali Vahidsafa, Palo Alto, CA (US)

(73) Assignee: Oracle International Corporation, Redwood City, CA (US)

( * ) Notice: Subject to any disclaimer, the term of this patent is extended or adjusted under 35 U.S.C. 154(b) by 375 days.

(21) Appl. No.: 13/472,105

(22) Filed: May 15, 2012

(65) Prior Publication Data

US 2013/0311814 A1 Nov. 21, 2013

(51) Int. Cl.
*G06F 1/00* (2006.01)
*H03K 5/01* (2006.01)
*H03L 7/00* (2006.01)
*G06F 1/12* (2006.01)
*G06F 1/14* (2006.01)

(52) U.S. Cl.
CPC ... *G06F 1/14* (2013.01); *G06F 1/12* (2013.01)
USPC .............................. 713/500; 327/100; 331/18

(58) Field of Classification Search
CPC ................ G06F 1/08; G06F 1/14; G06F 1/12
USPC .............................. 713/500; 327/100; 331/18
See application file for complete search history.

(56) References Cited

U.S. PATENT DOCUMENTS

| 4,556,984 | A | * | 12/1985 | Genrich | ........................... | 377/47 |
| 4,999,526 | A | * | 3/1991 | Dudley | ......................... | 327/152 |
| 5,425,074 | A | * | 6/1995 | Wong | ................................ | 377/47 |
| 7,161,398 | B2 | * | 1/2007 | Park et al. | ..................... | 327/149 |
| 8,073,092 | B2 | * | 12/2011 | Thomsen | ....................... | 375/373 |
| 8,155,615 | B2 | * | 4/2012 | Ruelke et al. | ................. | 455/295 |
| 2007/0208964 | A1 | * | 9/2007 | Sandon et al. | ................. | 713/501 |
| 2009/0106576 | A1 | * | 4/2009 | Jacobowitz et al. | .......... | 713/501 |
| 2010/0141310 | A1 | * | 6/2010 | Yu et al. | ........................ | 327/156 |
| 2011/0025391 | A1 | * | 2/2011 | Amrutur et al. | .............. | 327/170 |
| 2011/0119475 | A1 | * | 5/2011 | Chen et al. | ......................... | 713/2 |
| 2012/0051477 | A1 | * | 3/2012 | Lawange | ...................... | 375/371 |

OTHER PUBLICATIONS

Title: Gray Code—Publisher: Wikipedia—Retrieved from "http://en.wikipedia.org/w/index.php?title=Gray_code&oldid=615373253" Date: Jul. 17, 2014.*

* cited by examiner

*Primary Examiner* — Stefan Stoynov
(74) *Attorney, Agent, or Firm* — Polsinelli PC

(57) ABSTRACT

Implementations of the present disclosure involve an apparatus and/or method for providing a constant frequency timer signal for a microprocessor that operates with varying core clock signals. The apparatus and/or method utilizes a code generator, such as a gray code generator, operating on a reference clock signal that allows the constant frequency timer signal to be either faster or slower than the core clock frequency. More particularly, the apparatus and/or method may compute a difference between previous gray code samples and add the calculated difference to a software visible reference clock signal such that constant frequency timer signal may be faster or slower than the core clock signal. Through the use of the apparatus and/or method, a core clock signal may be reduced as needed to provide operational power savings to the microprocessor and the computing system employing the techniques described herein, while maintaining synchronization between the executing programs of the computing system.

18 Claims, 9 Drawing Sheets

CONSTANT FREQUENCY ARCHITECTURAL TIMER IN A DYNAMIC CLOCK DOMAIN

FIELD OF THE DISCLOSURE

Aspects of the present invention relate to computing systems and, more particularly, aspects of the present invention involve an apparatus and method for providing a constant timer signal in a microprocessor with a dynamic clock domain, including providing a constant timer signal in a microprocessor where the core clock frequency is lower than a reference clock frequency.

BACKGROUND

Computers are ubiquitous in today's society. They come in all different varieties and can be found in places such as automobiles, laptops or home personal computers, banks, personal digital assistants, cell phones, as well as many businesses. In addition, as computers become more commonplace and software becomes more complex, there is a need for the computing devices to perform at faster and faster speeds. For example, newer microprocessors often have higher operating frequencies than previous generations of microprocessors. As a result of the increased operating frequencies, newer generations of microprocessors may consume more power than previous generations of microprocessors.

To address this increase in consumption of power, many microprocessors now incorporate dynamic voltage frequency scaling (DVFS) to reduce the power consumed by the microprocessor. In general, DVFS techniques adjust the clock frequency at which the different cores of the microprocessor operate such that those cores consume less power. The scaling of the operating frequency of the one or more cores to a lower frequency may occur in response to the microprocessor detecting a lower processing requirement for the one or more cores. As a result, however, the cores of the microprocessor operate at varying clock frequencies as DVFS techniques are applied to the processor to reduce power consumption. In multithreaded microprocessors, the individual cores may be operating at a different frequency than the other cores of the microprocessor. The operation of a microprocessor at varying frequencies often introduces synchronization issues for communication between programs being executed by the cores of the microprocessor and between the microprocessor and other components of a computer system.

One such synchronization issue involves the scheduling and synchronization of software being executed by the microprocessor. Typically, a wide variety of software programs need access to a constant frequency clock, or constant timer signal, to synchronize operations between executing programs and communication with components of a computer system. Before the advent of DVFS, the constant timer signal was simply based on the constant core clock frequency of the microprocessor. However, with the cores of the microprocessor operating at varying frequencies, such reliance on the core clock signals is not available. Thus, techniques are described herein that provide a constant timing signal for executing software on a microprocessor that utilizes power saving techniques such as DVFS that vary the operating clock frequency of the microprocessor.

It is with these and other issues in mind that various aspects of the present disclosure were developed.

SUMMARY

One implementation of the present disclosure may take the form of a method for generating a timer signal in a microprocessor. The method includes the operations of generating a reference code that is configured to increment based on a reference clock signal and calculating a difference between a first value of the reference code and a second value of the reference code, the second value of the reference code occurring after the first value of the reference code. In addition, the method includes the operations of selecting from a plurality of inputs to a multiplexer based at least on the calculated difference between the first value of the reference code and the second value of the reference code and incrementing a recursive timer signal based at least on the selected input to the multiplexer.

Another implementation of the present disclosure may take the form of a circuit for generating a timer signal in a microprocessor. The circuit may comprise a code generating portion configured to generate a reference code based on reference clock signal and a synchronization portion configured to generate a selector signal for a multiplexer, the selector signal based at least on a calculated difference between a first value of the reference code and a second value of the reference code and wherein the synchronization portion is clocked by a core clock signal. The circuit may also include a timer signal generating portion configured to input the selector signal for the multiplexer, increment a recursive timer signal based at least on the selected input to the multiplexer and output the incremented recursive timer signal.

DETAILED DESCRIPTION

Implementations of the present disclosure involve an apparatus and/or method for providing a constant frequency timer signal for a microprocessor that operates with varying core clock signals. The constant frequency timer signal may be utilized by one or more programs executed by the microprocessor to synchronize operations between the cores of the microprocessor and between the program and other components of a computer system. The apparatus and/or method utilizes a code generator, such as a gray code generator, operating on a reference clock signal that allows the constant frequency timer signal to be either faster or slower than the core clock frequency. More particularly, the apparatus and/or method may compute a difference between previous gray code samples and add the calculated difference to a software visible reference clock signal such that constant frequency timer signal may be faster or slower than the core clock signal. Through the use of the apparatus and/or method, a core clock signal may be reduced as needed to provide operational power savings to the microprocessor and the computing system employing the techniques described herein, while maintaining synchronization between the executing programs of the computing system.

Figure 1:
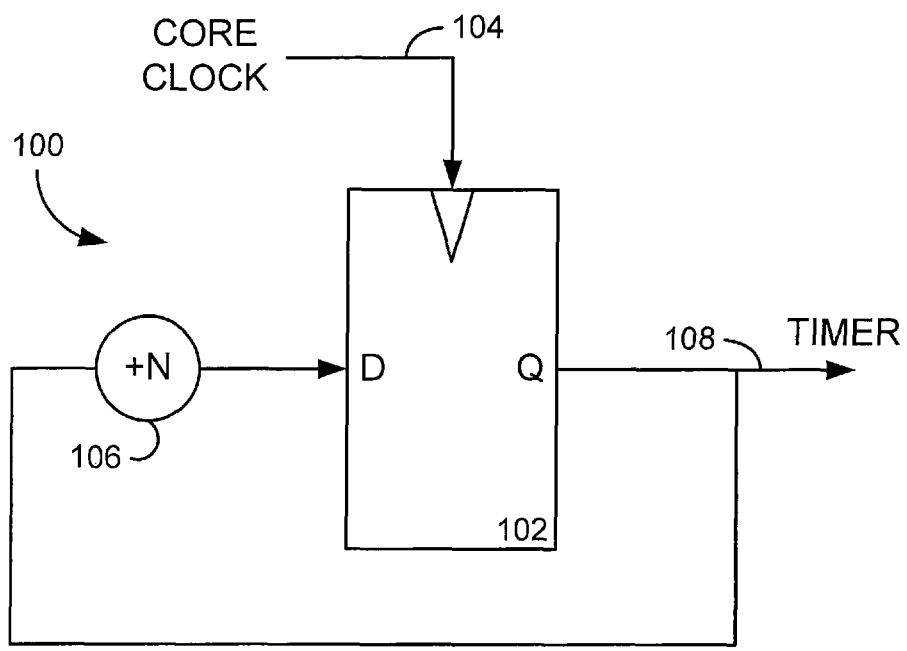
FIG. 1 is a circuit diagram illustrating the utilization of a core clock of a computing system to provide a constant frequency timer for use by the microprocessor in systems that have a constant core clock signal.

FIG. 1 is a circuit diagram illustrating the utilization of a core clock signal 104 of a computing system to provide a constant frequency timer signal for use in a computing system that has a constant core clock signal. Generally, because the core clock signal 104 of the computing system of FIG. 1 is constant, the constant frequency timer signal 108 may be a direct derivation of the constant core clock signal. More particularly and as shown in FIG. 1, a flip-flop electronic circuit device 102 or other latch-type electronic device is used as a counter based on the core clock signal 104. In operation, core clock signal 104 is provided to the flip-flop 102 such that at each rising edge of the core clock signal, the flip-flop device latches the value at the input ("D") of the flip-flop, and provides that value to the output ("Q") of the flip-flop. The output Q of the flip-flop is used as the constant frequency timer signal 108 of the computing system. Also, in some embodiments, output Q is adjusted by a normalization value N at adder 106 and fed back to the input D of the flip-flop 102. For example, in one embodiment the value N could equal one (1) such that flip-flop 102 increments by one at each rising edge of the core clock signal 104, providing a counter circuit based on the core clock frequency. In this embodiment, the software receiving the constant timer signal 108 is aware of the core clock frequency and converts the received constant frequency signal to a period that is utilized by the software program. For example, core clock signal may operate at 100 nanoseconds such that output Q would increment by one every 100 nanoseconds, or at the same time as the core clock signal increments. To obtain a constant timer signal at any frequency desired by the software, the program may convert the received constant timer signal 108 by a scaling factor to get a constant frequency timer signal at the desired timer frequency. For example, the software program may adjust a constant timer signal 108 that operates at 100 nanoseconds by scaling the signal to real time, such as a timer signal that cycles every second.

In another embodiment, the hardware of the circuit 100 adjusts or normalizes the constant timer signal 108 frequency by setting the value N of adder 106 to scale the timer signal frequency to a real time frequency. Thus, rather than the software programs that receive the constant timer signal 108 based on the constant core clock signal 104 scaling the frequency to a desired frequency, the value N of adder 106 scales the frequency to normalize the frequency of the constant timer signal 108 as desired by the computing system. As such, the value N of the adder 106 may be any value to normalize the constant timer signal 108 to any desired frequency.

In general, the circuit of FIG. 1 is utilized by a computing device to generate a constant frequency signal when a constant core clock signal is present and known. However, it is often the case that the core clock signal frequency varies over time as dynamic voltage frequency scaling (DVFS) techniques are applied to a microprocessor to reduce the power consumed by the microprocessor. As explained above, DVFS techniques adjust the frequency at which the different cores of the microprocessor operate such that those cores consume less power at specific times. However, because DVFS techniques vary the core clock frequency over time, and sometimes between cores of the same microprocessor, the core clock signal cannot be directly relied upon to pace a constant timer signal for use by the software of the microprocessor.

Figure 2:
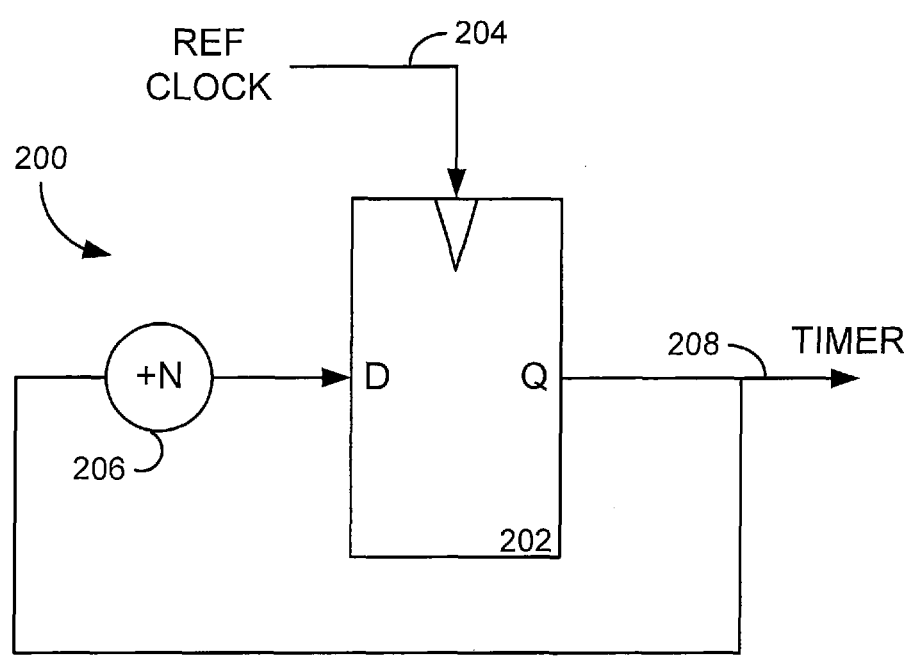
FIG. 2 is a circuit diagram illustrating the utilization of a reference clock of a computing system to provide a constant frequency timer for use by the microprocessor that has a varying core clock signal.

In another embodiment, illustrated in FIG. 2, a reference clock signal is used to pace the operation of the latch 202. In particular and similar to the embodiment of FIG. 1, a latch 202 is included that operates as a counter of a constant signal to provide the constant timer signal 208 at the output Q of the latch. Also, the input D of the latch 202 is the output signal Q adjusted by some value N at circuit element 206. However, rather than pacing the operation of the latch 202 off of a core clock signal as described in FIG. 1, the circuit 200 of FIG. 2 paces the latch operation based on a reference clock signal 204. In general, the reference clock signal 204 is a constant frequency input to a microprocessor or computing system normally used for driving one or more phase-locked loop (PLL) clock elements of the computing system. Thus, while core clock signals may vary during operation of a computing system, the reference signal 204 typically remains constant during operation of the computing system. However, in order for the timer signal of the embodiment for FIG. 2 to be utilized by the computing system, the signal should operate in the core clock domain. One approach to utilizing a constant timer signal based on a reference clock signal is to synchronize the reference clock signal with the core clock signal. One such approach is illustrated in FIG. 3A below.

Figure 3A:
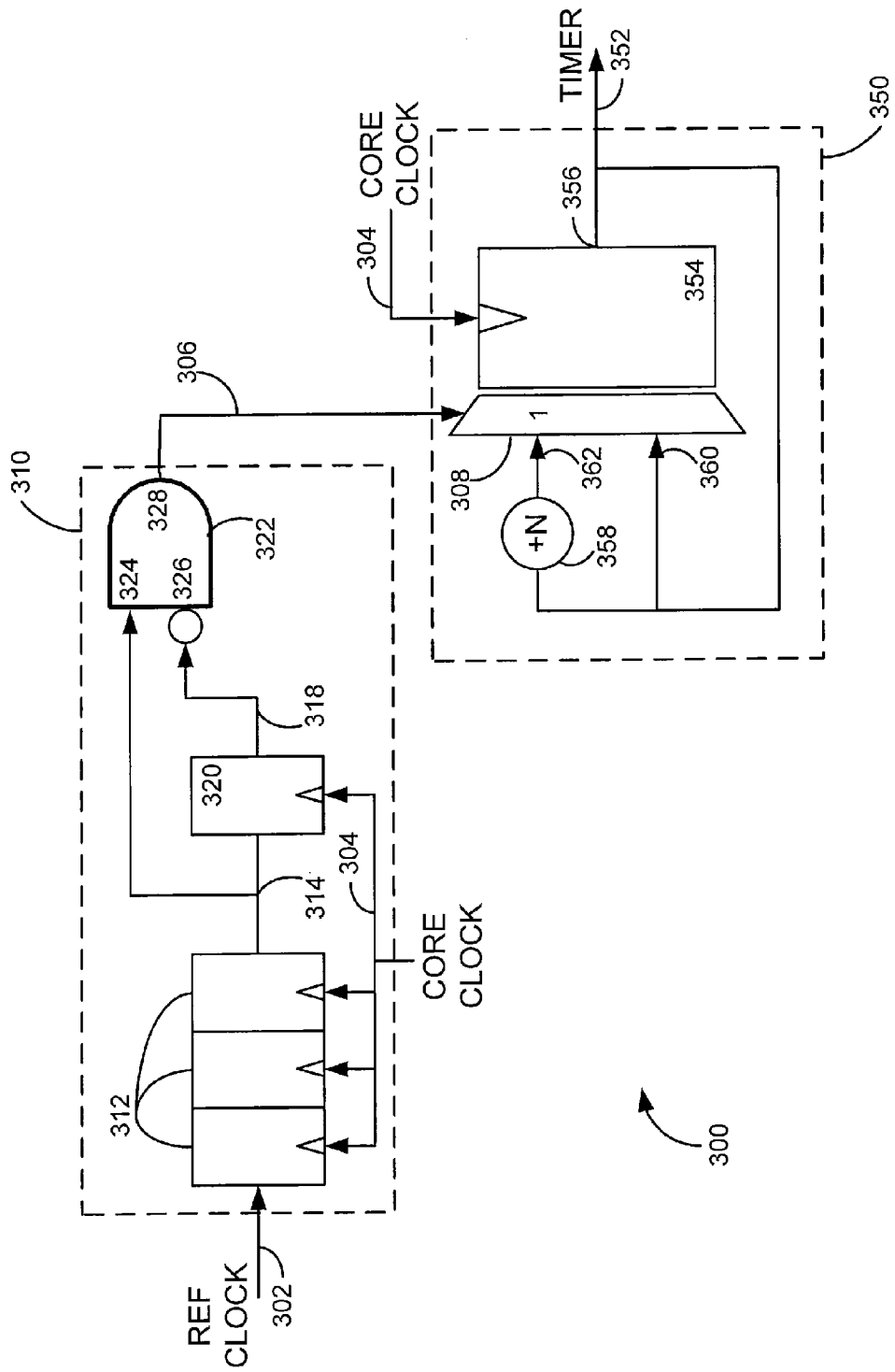
FIG. 3A is a circuit diagram illustrating the utilization of a reference clock of a computing system to provide a constant frequency timer for use by the microprocessor that includes varying core clock signal with a faster access time.
Figure 3B:
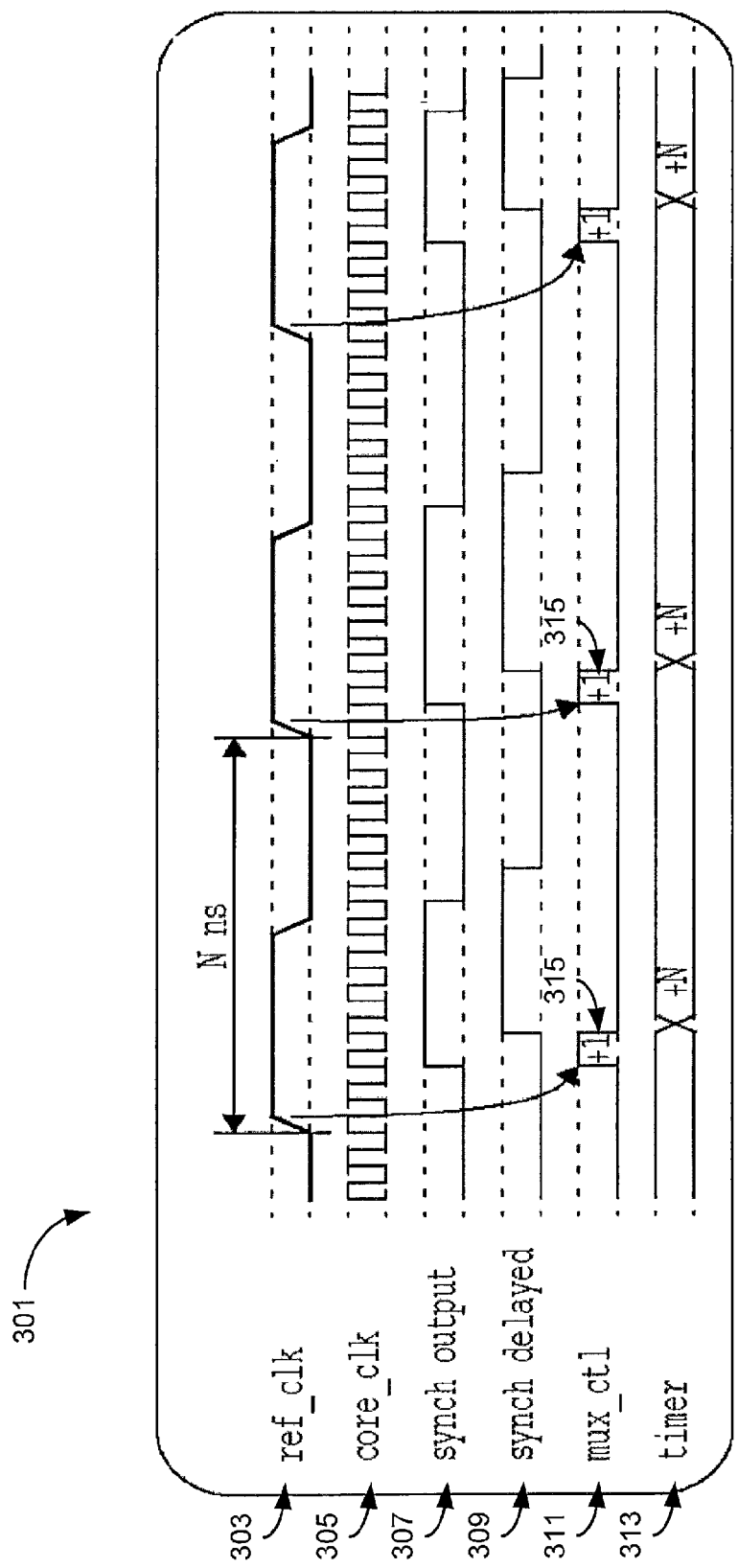
FIG. 3B is a timing diagram illustrating the constant frequency timer of the circuit diagram of FIG. 3A.

FIG. 3A is a circuit diagram illustrating the utilization of a reference clock signal 302 of a computing system as a data signal to the circuit 300 to provide a constant frequency timer signal 352 for use by the microprocessor. In general, the circuit 300 uses a delayed reference clock signal 302 as an enable or select signal 306 to select when the constant timer signal is incremented. Further, the circuit 300 allows faster access to the constant timer signal 352 when compared to the circuit of FIG. 2 described above as the constant timer signal operates in the core clock domain. FIG. 3B is a timing diagram illustrating several signals of the circuit diagram of FIG. 3A, including the constant frequency timer signal.

The circuit 300 includes a reference clock signal 302 similar to the reference clock signal described above. The circuit 300 also includes a core clock signal 304 that may vary over time as power saving techniques are applied to the microprocessor, as also described above. These clock signals are utilized herein by the circuit 300 to create a synchronized enable or select signal 306 that operates to control a multiplexer device 308. In general, the circuit 300 includes a synchronization portion 310 and a counter portion 350. Beginning with the synchronization portion 310, a reference clock signal 302 is provided as an input to a series of latches or flip-flops 312 that operate to synchronize the reference clock signal to a determined number of core clock cycles. The synchronization latches 312 are one or more latches connected in series such that the output of the first latch of the series is connected to the input of the second latch, the output of the second latch is connected to the input of the third latch, and so on. Although only three such latches are shown in the circuit, it should be appreciated that any number of latches 312 may be connected in series to create the synchronization latch circuit 312. As also shown, the synchronization latches 312 are timed, paced or otherwise operate on the rising edge of the core clock signal 304. In operation, the synchronization latches 312 operate to receive the reference clock signal 302 and delay the reference clock signal input a certain number of core clock cycles, the number of core clock cycles equal to or near the number of latches included in the latch synchronization circuit. The synchronized signal, referred to herein as the synch output, is provided at the output of the last latch in the series of latches 312 that comprise the synchronization latch circuit. This output is illustrated in the circuit 300 as node 314. The operation of the synchronization latches 312 is shown in the timing diagram 301 of FIG. 3B.

The timing diagram 301 illustrates the reference clock signal 303 and the core clock signal 305 for a general amount of operating time of the microprocessor. As should be appreciated, the frequency core clock signal 305 may vary over time as power saving techniques are executed by the microprocessor. However, for this example, it is assumed that the core clock frequency is constant for at least the amount of time illustrated in the timing diagram 301. As shown, the synch output signal 307, taken at node 314 of circuit 300, is the reference clock signal 303 delayed by three core clock cycles 305. In other words, a rising edge in the reference clock signal 303 produces an accompanying rising edge in the synch output signal 307 three core clock cycles later as the reference clock signal is propagated through the synchronization latches 312 on each clock cycle. The number of core clock cycles 305 that the synch output signal 309 is delayed equals or is near the number of latches in the latch synchronization circuit 312.

Returning to the circuit 300 of FIG. 3A, a first input 324 to a logic device 322 is electrically attached to node 314 to receive the output of the latch synchronization circuit 312. Also electrically connected to node 314 is an input to a delay latch 320. Delay latch 320 is a latch device that operates on the core clock signal 304. The output 318 of the delay latch 320 is electrically connected to the second input 326 of the logic device 322. The output 318 signal of the delay latch 320 is referred to herein and in the timing diagram 301 of FIG. 3B as "synch delayed". As further discussed below, the delay latch 320 operates to delay the input signal at node 314 for one core clock cycle, providing a delay to cutoff the enable signal 306 provided by the synchronization portion 310 of the circuit 300.

The logic device 322 of the circuit 300 is, in one embodiment, an "and" logic gate with a first input 324, a second input 326 that includes an inverter at the input and an output 328. In general, however, the logic device 322 may be any electrical logic device, group of devices or software program for performing the logic described herein. The output 328 of the logic device 322 is the output of the synchronization portion 310 of the circuit 300 and is referred to herein as the "mux controller signal" or "mux_ctrl" as noted in the timing diagram 301. The operation of the delay latch 320 and the logic gate 322 in relation to the mux controller signal is now described.

As mentioned above, the signal at node 314 is provided as the first input 324 of the logic device 322. The signal at node 314 is the synch output signal 307 of the timing diagram 301. Further, the output 318 of the delay latch 320 is provided to the inverting second input 326 of the logic device 322. As can be seen in the timing diagram 301, the output 318 of the delay latch 320, shown in the timing diagram 301 as synch delayed signal 309, is simply the synch output 307 signal delayed by one core clock cycle. During operation, the output 328 of the logic device 322 provides an enable signal as an output of the synchronization portion 310 of the circuit 300 to control the multiplexer 308. More particularly and turning to the timing diagram 301 of FIG. 3B, the mux controller signal 311 starts low as the synch output 307 is low and the synch output delay 309 is low. Rather, because synch output delay 309 is inverted at the second input 326 to the logic gate 322, the logic gate initially receives a low at the first input 324 and a high at the second input 326, resulting in a low output 328. Three core clock cycles after the reference clock signal 303 goes high, the synch output 307 at node 314 also goes high. At this time, the signal at the first input 324 is high and the inverted synch delay signal 309 at the second input 326 is also high. As such, the output of the logic device 322, noted as the mux controller signal 311 in the timing diagram 301, goes high providing an enable signal to the multiplexer 308. The function of the enable signal 306 on the multiplexer 308 is described in more detail below.

One core clock cycle later, synch delay signal 309 goes high as propagated through the delay latch 320. Thus, at this time, the synch output signal 307 at the first input 324 to the logic device 322 remains high but the synch delay signal 309 is inverted to a low at the second input 326 to the logic device, resulting in a low output 328 of the logic device 322, or low mux controller signal 311.

At some later time, the reference clock signal 303 goes low, which is delayed by the synchronization latches 312 such that synch output signal 307 also goes low. At this time, the signal at the first input 324 of the logic device 322 is low and the inverted signal at the second input 326 is also low (the inverted synch delay signal 309), resulting in a low output 328 of the logic gate 322. One clock cycle later, the synch delayed signal 309 also goes low, which maintains the output 328 of the logic gate 322 low. Thus, as shown in timing diagram 301, the operation of the synchronization portion 310 of the circuit 300 provides a positive pulse 315 with a duration of one core clock cycle as an input into the multiplexer 308. Also, the positive pulse 315 occurs a certain number of core clock cycles after the rising edge of the reference clock signal 303, equal to or near the number of synchronization latches 312 in the synchronization latch circuit. As explained in more detail below, the mux controller signal 311 on the output 306 of the synchronization portion 310 of the circuit 300 operates to control the multiplexer 310 to increment a counter circuit 350 to provide a constant timer signal 352 that may be utilized by the computing device.

The counter portion 350 of the circuit 300 of FIG. 3A is similar to the circuits described above with reference to FIGS. 1 and 2, but includes a multiplexer 308 device to select when the timer signal is incremented. In particular, the counter portion 350 includes a counter latch 354 that is timed by the core clock 304. The output 356 of the counter latch 354 provides the constant timer signal 352 for use by the computing system. Further, the output 356 of the counter latch 354 is also electrically connected as a first input to a multiplexer 308 and as a second input to the multiplexer after being multiplied by normalizing value N at adder 358. The multiplexer 308 is configured to pass the signal value at first input 360 when the value on selector input 306 is low and to pass the signal value at second input 362 when the value on selector input 306 is high. Whatever value is passed by the multiplexer 308 in response to the value on the selector input 306 is then latched by the counter latch 354 and transmitted on the output 356 of the counter latch as the constant timer signal 352.

In operation, the counter latch 354 repeatedly stores the same value in the latch while the selector input 306 to the multiplexer 308 remains low. In particular, the output 356 of the counter latch 354 is fed back as a first input 360 to the multiplexer 308 such that, at each cycle of the core clock signal 304 where the enable signal 306 is low, the value at the output is re-latched by the counter latch. This is shown in the timing diagram 301 of FIG. 3B as the timer signal 313. At the beginning of the time segment shown, the value provided by the timer signal 313 remains the same through multiple cycles of the core clock. However, as described above, the synchronization portion 310 of the circuit 300 provides an enable or selection signal on output 306, referred to as the mux controller signal 311. Upon generation of the positive pulse on output 306, the multiplexer 308 passes the value at second input 362 to the latch 354. More particularly and similar to the circuits above of FIGS. 1 and 2, the value at second input 362 of the multiplexer 308 is the constant timer signal 352 normalized by value N at adder 358. Thus, as shown in the timing diagram 301, the constant timer signal 313 is incremented by N each time the positive pulse 315 of the mux_ctl 311 is provided to the selector input of the multiplexer 308. In this manner, a constant timer signal 352 normalized to a desired frequency N is provided by the circuit 300 of FIG. 3B. Also, the timer signal 352 is provided at a constant frequency regardless of the frequency of the core clock 305 such that the constant timer signal can be obtained as the frequency of the core clock signal is adjusted during power saving techniques. Further, because the latches of the circuit 300 continue to operate on the core clock signal rather than the reference clock signal, access time to the constant timer signal is not slowed.

However, one drawback to the constant timer signal circuit of FIG. 3A is that the minimum core clock frequency is about three to four times the reference clock frequency. This disparity in the frequencies between the minimum core clock and the reference clock is to provide enough time for the reference clock signal to propagate through the synchronization portion 310 of the circuit 300 while maintaining the constant timer signal output and to allow the signals to stabilize. However, some microprocessors may operate more efficiently with the core clock frequency that is slower than the floor limit imposed by the circuit 300 of FIG. 3A. In response, FIG. 4A is a first embodiment of a circuit diagram illustrating the utilization of a reference clock of a computing system and a gray code to provide a constant frequency timer for use by the microprocessor that allows the core clock frequency to be slower than the reference clock signal.

Figure 4A:
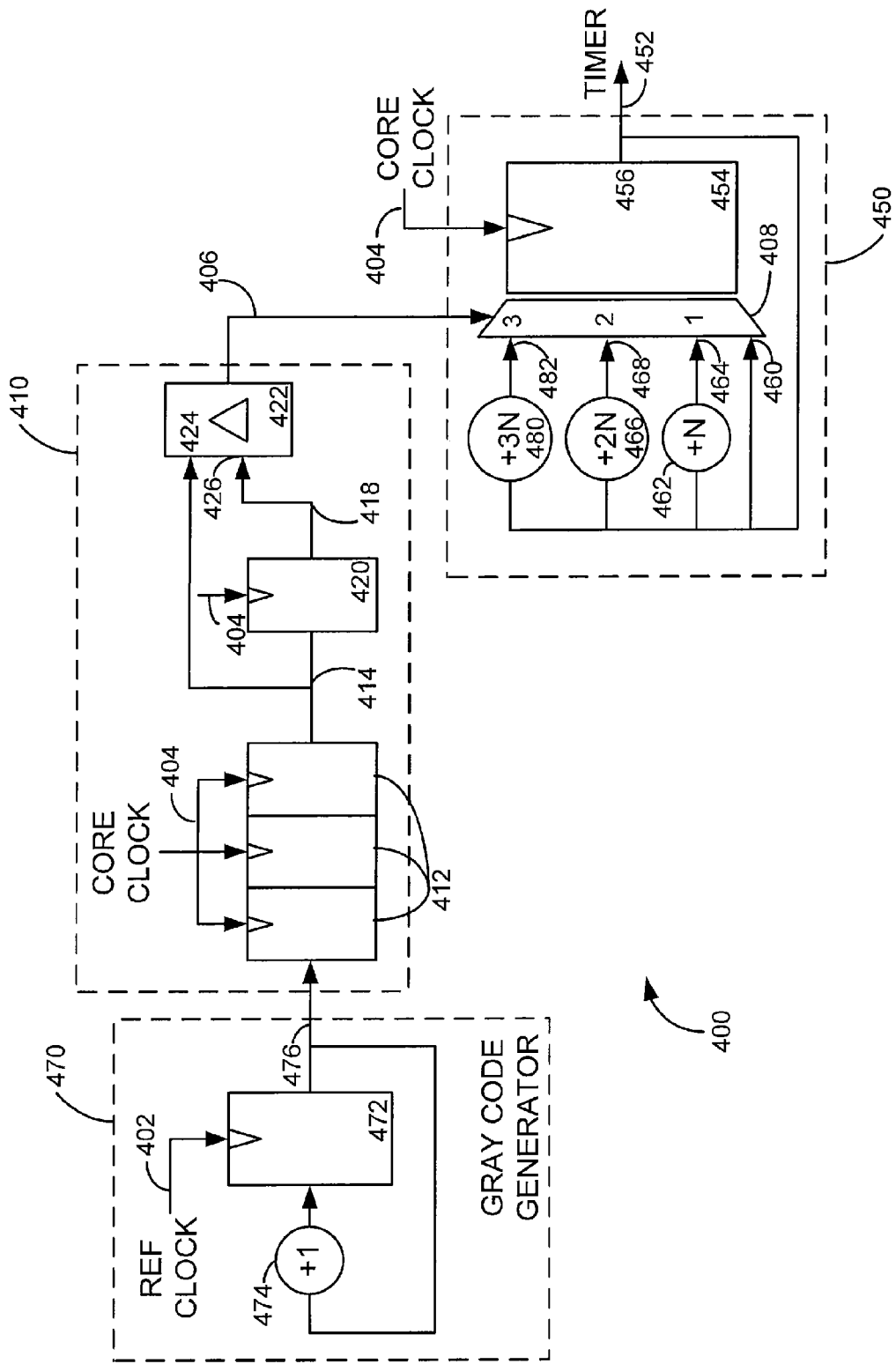
FIG. 4A is a first embodiment of a circuit diagram illustrating the utilization of a reference clock of a computing system and a gray code to provide a constant frequency timer for use by the microprocessor that includes varying core clock signal.

Similar to the circuit shown in FIG. 3A, the circuit 400 of FIG. 4A also includes a synchronization portion 410 and a counter portion 450. However, in this embodiment, rather than using the reference clock signal 402 as an input to the synchronizer portion 410, the reference clock signal is used to increment a gray code engine portion 470 that is provided as the input to the synchronizer portion. In general, this circuit 400 provides a selection signal to a multiplexer by comparing a current value of the gray code engine to a previous value to determine how many reference clock cycles has past between the current value and the previous value. This determination is the multiplexer control signal 406 that selects the proper input to the multiplexer 408 to provide a constant timer signal 452 that allows the core clock signal 404 to be slower or faster than the reference clock signal 402.

The gray code engine portion 470 of the circuit 400 of FIG. 4A provides a gray code as input 476 for the rest of the circuit. In general, a gray code is a binary numerical value where two successive values differ by only one bit. For example, a two-bit gray code can represent a numerical value between 0-3 where each successive value differs by only one bit. Gray codes with more bits may represent larger numerical values. In general, any known technique for creating a gray code may be utilized with the embodiment of FIG. 4A to provide a gray code input to the synchronization portion 410 of the circuit 400. Further, any known technique for counting using one or more bits may be utilized by the embodiment of FIG. 4A to maintain the number of cycles of the reference clock signal 402 that occur during a period of time. For example, the circuit 400 may utilize a simple binary counting circuit to count the number of reference clock cycles that occur during a specified time, or may utilize a software program to count the number of cycles. Thus, the gray code embodiment discussed herein is merely one example of the type of counter that could be used with the circuit 400.

In the embodiment 400 shown in FIG. 4A, the gray code counter portion 470 includes a gray code latch 472 that is paced or clocked by the reference clock signal 402. Similar to the above described counter circuits, the output of the gray code latch 472 is fed back as an input to the latch after being incremented at adder 474. In this embodiment, the output is incremented by one at adder 474. In general, the gray code counter portion 470 provides an incrementing gray code counter at the output of the circuit. As explained in more detail below, the gray code counter values are repeated while incremented. For example, for a two-bit gray code, the counter circuit 470 may provide a code that counts from zero to three and returns to zero when the value of three is incremented, providing a repeating counter.

The gray code portion output 476 is provided as the input to the synchronization portion 410 of the circuit 400. The synchronization portion 410 of the circuit 400 is similar to the synchronization portion 310 described above with reference to FIG. 3A. Namely, the synchronization portion 410 includes a series of synchronization latches 412 paced by the core clock signal 404 to delay or synchronize the input to the core clock signal. Also similar to the above embodiment, the synchronization latches 412 includes any number of latches connected in series. In addition, the output 414 of the synchronization latches 412 is provided to a first input 424 of a logic circuit 422. The output 414 of the synchronization latches 412 is also provided to a delay latch 420 such that the output 418 of the delay latch is the input signal delayed by one core clock cycle. This delayed synch output signal 418 is provided as a second input 426 to the logic circuit 422.

In general, the logic circuit 422 is configured to determine the number of reference clock cycles that occur during the delay of the gray code signal through the delay latch 420. For example, the reference clock frequency may be twice the core clock frequency. Thus, a current gray code value is provided to the logic circuit 422 at the first input 424. At the same time, a previous gray code value 418 that has been delayed by the delay latch 420 for one core clock cycle is provided at the second input 426. Because the gray code is paced by the reference clock frequency and the reference clock frequency is twice the core clock frequency in this example, the gray code signal has incremented by two during the core clock cycle delay at the delay latch 420. Thus, the difference between the current gray code value 414 and the previous gray code value 418 in this example is two. This difference is therefore calculated by the logic circuit 422 and provided as an output 406 of the synchronization portion 410 of the circuit 400.

In another example, the core clock frequency may be greater than the reference clock frequency. Thus, during the delay of one core clock cycle implemented at the delay latch 420, the gray code may not be incremented. Thus, the present value 414 of the gray code provided at the first input 424 of the logic circuit 422 and the previous value 418 provided at the second input 426 is the same gray code value (as the delay at the delay latch was less than the frequency at which the gray code is incremented). In this example, the logic circuit 422 determines the difference between the previous value and the current value as zero and provides that value as the output 406 of the synchronization portion 410. In general, the logic circuit may be comprised of a logic component, a collection of logic components or software that performs the logic functions described herein.

Also similar to the circuit of FIG. 3A, the output 406 of the synchronization portion 410 of the circuit 400 is a multiplexer control signal that operates to select from a plurality of inputs to a multiplexer 408 of a counter portion 450 of the circuit. In general, the counter portion 450 of the circuit 400 of FIG. 4A is similar to the counter portion of the circuit of FIG. 3A. For example, a counter latch 454 is included that is paced by the core clock signal 404. The output 452 of the counter latch 454 is a constant timer signal 452 that may be utilized by the computing system and/or executing software on the computing system for timing applications. Also, the output 456 signal is connected as a direct input to a multiplexer 408 or as a normalized variant of the signal as one or more inputs to the multiplexer. The multiplexer control signal 406 is used by the multiplexer 408 to select from the plurality of inputs which are then provided to the counter latch 454 for storing.

More particularly, the output 456 of the counter latch 454 is provided as a direct first input 460 to the multiplexer 408. A second input 464 is also provided that has been normalized by value N at adder 462. In other words, the output 456 is added to the value N at adder 462 to normalize the signal. A third input 468 is provided that has been normalized by twice the value of N (+2N) at adder 466 and a fourth input 482 is provided that has been normalized by three times N (+3N) at adder 480. In operation, the multiplexer 408 selects from the first 460, second 464, third 468 or fourth input 482 based on the value of the multiplexer controller signal 406 at the selector input. Thus, the multiplexer controller signal 406 may include a plurality of bits to select from the plurality of inputs to the multiplexer 408.

As described above, the multiplexer controller signal 406 is the calculated difference between a present gray code value and a previous gray code value. Thus, based on this calculated difference, the multiplexer 308 selects the proper input to be latched at the counter latch 454. In particular, if the calculated difference provided by multiplexer control signal 406 is three, the multiplexer 408 selects the value at the fourth input 482 for latching. Similarly, if the calculated difference provided by the value of the multiplexer control signal 406 is two, the multiplexer 408 selects the value at the third input 468 for latching, if the calculated difference provided by multiplexer control signal 406 is one, the multiplexer 408 selects the value at the second input 464 for latching and if the calculated difference provided by multiplexer control signal 406 is zero, the multiplexer 408 selects the value at the first input 460 for latching. In this manner, the constant timer signal 452 is incremented by the value based on the calculated difference between a present and previous gray code value. It should be appreciated that the value of the multiplexer control signal 406 represents the number of reference clock cycles that occur during one core clock cycle. A further explanation of the operation of the circuit 400 of FIG. 4A is provided below in relation to the timing diagrams of FIGS. 4B and 4C.

One advantage gained by utilizing a gray code sequence rather than a typical binary code sequence in the circuit 400 is a decrease in the likelihood of a missed or inaccurate timer signal. More particularly, as described above, a gray code is a binary numerical value where two successive values differ by only one bit. Thus, the gray code guarantees that no increments of the counting of the reference clock signal are missed if multiple reference clock cycles occur during a single core clock cycle. Utilizing a binary code sequence where multiple bits may change during the same reference clock cycle may provide an incorrect count or value when synchronized by the core clock signal that would make the calculations performed by the circuit 400 inaccurate. Such an inaccurate calculation may ultimately result in a timer signal 452 that is not constant.

It should be noted that the circuit 400 of FIG. 4A does not require that the core clock frequency be greater than the reference clock frequency. Rather, the circuit 400 may provide a constant timer signal 452 regardless of whether the core clock frequency is higher or lower than the reference clock frequency. This provides added flexibility in the application of power saving techniques to the microprocessor. Namely, the core clock frequency can be set at any frequency as needed by the microprocessor such that the core clock frequency does not have a minimum floor value. Such a design provides flexibility and power savings over other embodiments of a constant timer signal generating circuit.

Figure 4B:
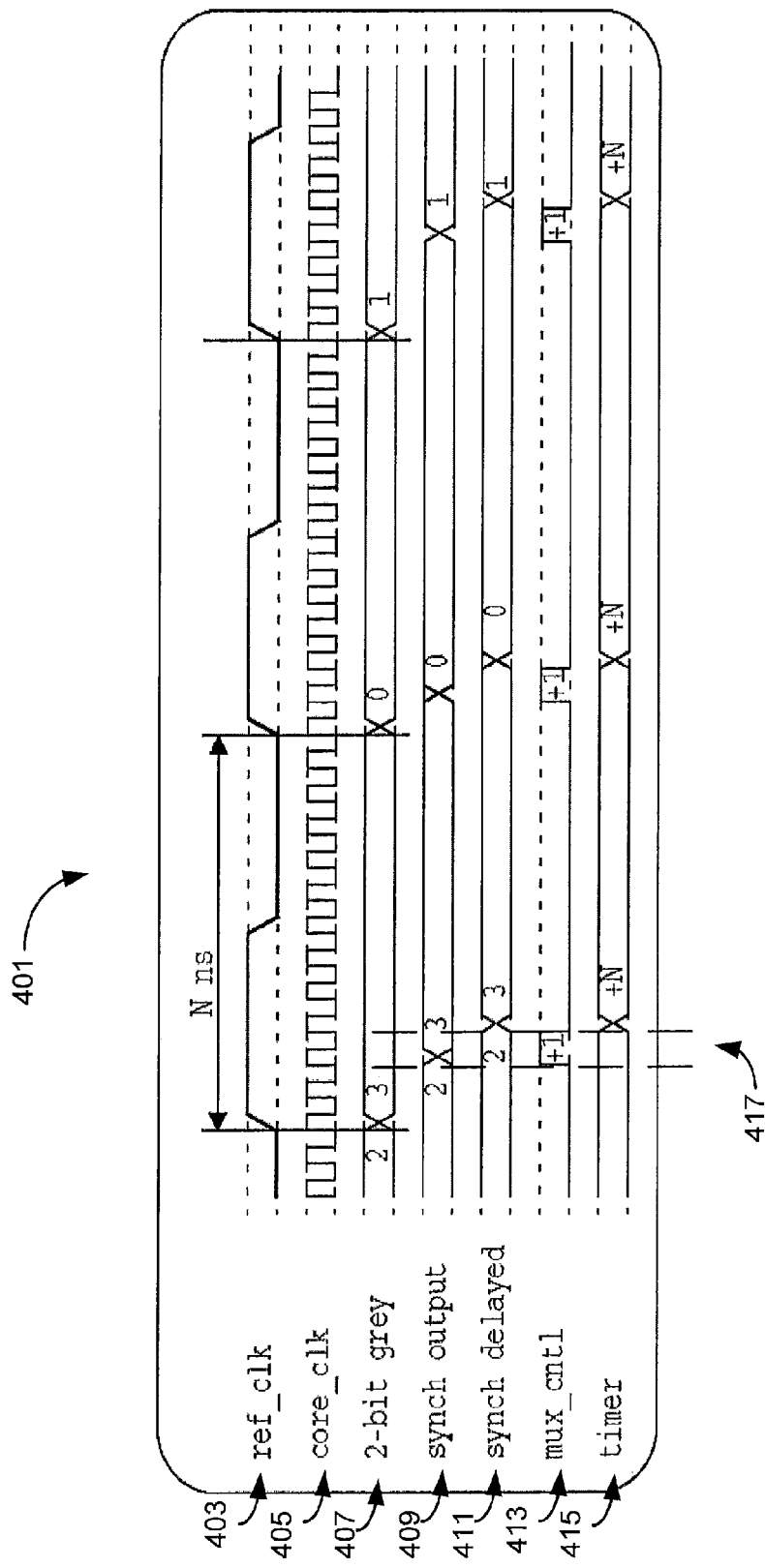
FIG. 4B is a timing diagram illustrating the constant frequency timer of the circuit diagram of FIG. 4A when the core clock signal is faster than the reference clock signal.
Figure 4C:
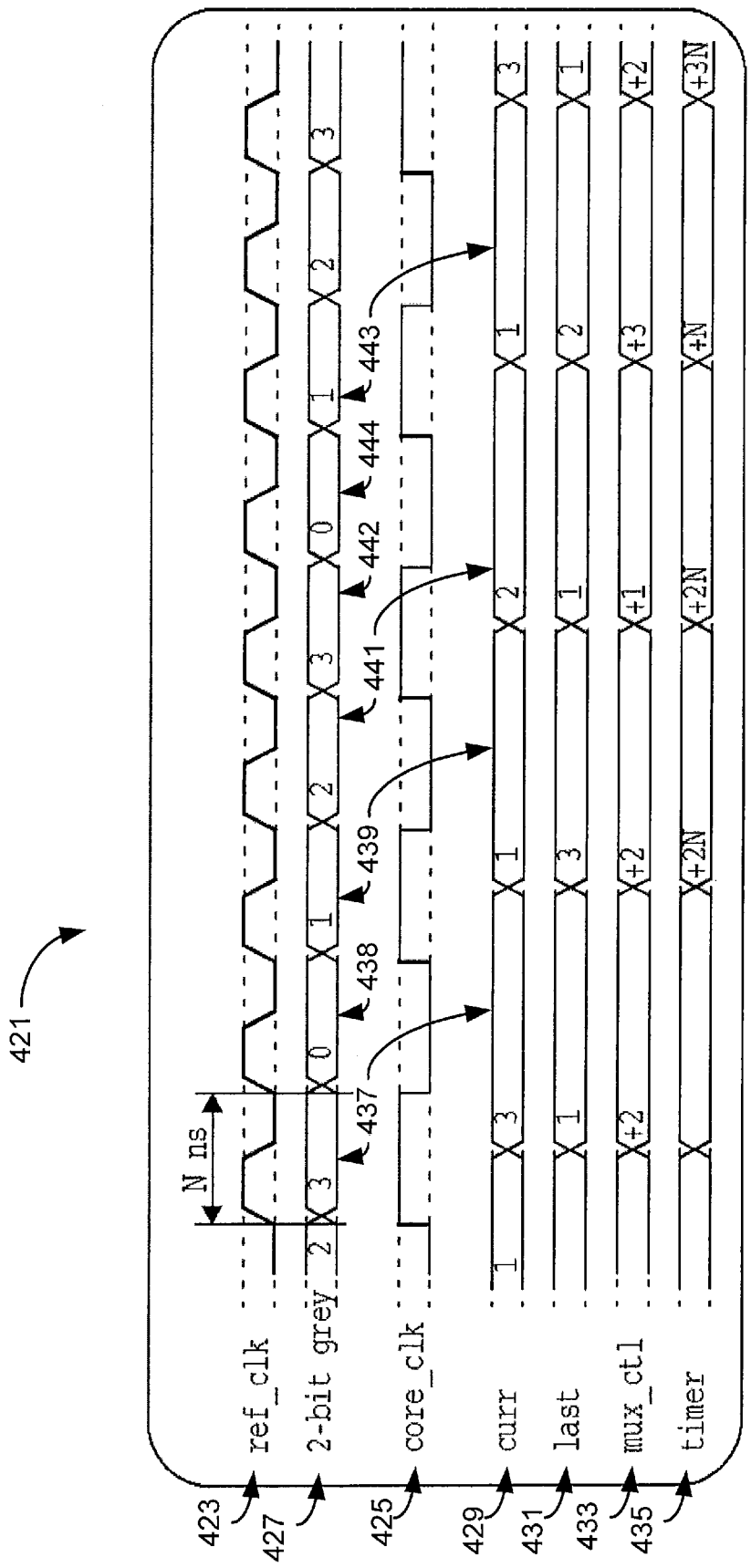
FIG. 4C is a timing diagram illustrating the constant frequency timer of the circuit diagram of FIG. 4A when the core clock signal is slower than the reference clock signal.

The operation of the circuit 400 of FIG. 4A can be understood through the timing diagram 401 of FIG. 4B and the timing diagram 421 of FIG. 4C. In particular, FIG. 4B is a timing diagram 401 illustrating the constant frequency timer of the circuit diagram 400 of FIG. 4A when the core clock signal is faster than the reference clock signal. As can be seen from the timing diagram 401, the circuit 400 of FIG. 4A operates in a similar manner as the circuit 300 of FIG. 3A, namely that the synchronization portion 410 of the circuit 400 provides a positive pulse signal as a selection signal to a multiplexer 408 that increment the constant timer signal 452 at a constant rate based on the reference clock signal.

The timing diagram 401 of FIG. 4B includes a reference clock signal 403 and a core clock signal 405. In this example, the frequency of the reference clock signal 403 is slower than the frequency of the core clock signal 405. Also included in the timing diagram 401 is a 2-bit gray code signal 407. As described above, the gray code signal 407 may comprise a two-bit code that represents a numerical value between 0-3 and where each successive value differs by only one bit. As shown, the gray code signal 407 increments at the same frequency as the reference clock signal 403 such that the code increments upon each rising edge of the reference clock signal. Also, in this particular example, the gray code signal 405 value repeats the sequence of incrementing from zero to three. In general, the 2-bit gray code signal 407 is provided as an input 476 to the synchronization portion 410 of the circuit 400 of FIG. 4A.

A synchronization output signal 409 is also provided in the timing diagram 401. The synchronization output signal 409 is the 2-bit gray code signal 407 as delayed by the synchronization latches 412 of the circuit 400. In this particular example, the synch output signal 407, which may be measured at node 414 of circuit 400, is the 2-bit gray code signal 407 delayed by three core clock cycles 405. However, the number of core clock cycles 405 that the 2-bit gray code signal 407 is delayed equals or is near the number of latches in the synchronization latches circuit 412 as each latch in the synchronization latches is paced by the core clock signal. Also included in the timing diagram 401 is the synch delay signal 411 which is measured at the output 418 of the delay latch 420. The synch delay signal 411 is the synch output signal 409 delayed by one core clock cycle as the synch output signal passes through the delay latch 420, thereby being delayed by one core clock cycle. Note that the 2-bit gray code signal 407, the synch output signal 409 and the synch delay signal 411 are multi-bit signals wherein the multiple bits represent a value. In this particular example, the signals are 2-bit signals. However, the signals may include any number of bits to account for the disparity between the frequencies of the core clock signal and the reference clock signal, described in more detail below.

In operation, the synch output signal 409 or value is provided as the first input 424 to the logic circuit 422. Also, the synch delay signal 411 or value is provided as the second input 426 to the logic circuit 422. As described above, the logic circuit 422 determines the difference between the value at the first input 424 and the value at the second input 426 and provides the calculated difference as the output 406. Thus, during time segment designated as time 417, the value of the synch output signal 409, provided as the first input 424, is a digital three while the value of the synch delay signal 411, provided as the second input 426, is a digital two. The calculated difference between the inputs is a digital value of one, which is illustrated in the timing diagram 401 as multiplexer control signal 413. Following time 417, the synch delay signal 411 value becomes a digital three such that the difference calculated becomes zero. As a result, the multiple control signal 413 returns to a value of zero.

As shown in the circuit 400 of FIG. 4A and timing diagram 401, the multiplexer controller signal (406, 413) is transmitted to the multiplexer 408 as a selector signal that selects which input of the multiplexer is latched in the counter latch 454. In particular, a digital value of zero on the selector signal 406 selects the value at input 460 and a digital value of one selects the value at input 464. Returning to the timing diagram 401 of FIG. 4B, a constant timer signal 415 is shown that is incremented by the multiplexer control signal 413. More particularly, the positive pulse occurring on the multiplexer control signal 413 (such as at time 413) selects the value at input 464 of the multiplexer 408 that has been normalized by value N at adder 462. In this manner, the positive pulse of the multiplexer control signal 412 increments the timer signal 415 by the value N at a constant frequency. This constant timer signal 415 may then be utilized by the computing system for timing purposes of one or more software programs.

As mentioned above, the circuit of FIG. 4A also provides a constant timer signal when the core clock frequency is slower than the reference clock frequency. FIG. 4C is a timing diagram 421 illustrating the constant frequency timer of the circuit diagram of FIG. 4A when the core clock signal is slower than the reference clock signal. The timing diagram 421 includes a reference clock signal 423 and a core clock signal 425. In this example, the core clock signal 425 frequency is slower than the reference clock signal 423 frequency. Also included in the timing diagram 401 is a 2-bit gray code signal 427 that is paced by the reference clock signal 423 such that the code increments by the value of one upon each rising edge of the reference clock signal, from 0-3. Also, in this example, the gray code signal 405 value repeats the sequence of incrementing from zero to three.

As mentioned above, the 2-bit gray code signal 427 is delayed through the synchronization latches 412 of the circuit. In this example, the 2-bit gray code signal 427 is delayed by three core clock cycles as three synchronization latches 412 are included in the circuit 400. This delayed signal is shown in the timing diagram as the current value signal 429 or "curr" and may be measured at node 414 of the circuit 400. However, to simplify the timing diagram 421 of FIG. 4C, this delay is not shown in the timing diagram. Rather, the current value signal 429 is illustrated with a small delay to simplify the description of the signals. It should be appreciated, however, that the propagation of the 2-bit gray code signal through the synchronization latches, as represented by current value signal 429, is delayed by three core clock cycles.

As mentioned, the current value signal 429 represents the a current value of the 2-bit gray code at the output of the synchronization latches 412, or at node 414. However, the 2-bit gray code engine portion 470 operates on the reference clock 423 frequency that is faster than the core clock 425 frequency which paces the synchronization latches 412. As such, it is possible that the 2-bit gray code increments multiple times before being latched into the synchronization latches 412. This can be seen by a comparison of the 2-bit gray code signal 427 and the current value signal 429 of the timing diagram 421. More particularly, the timing diagram 421 illustrates a gray code value of three propagating to the current value signal 429 (at point 437). The next value in the current value signal 429 is a value of one, meaning that the gray code value of zero 438 that was generated following the value of three was not captured by the latches 412. Rather, the gray code engine portion 470 provided the zero value 438 before the latches 412, which operate on the slower core clock frequency, could capture the value. The digital one value 439 of the gray code was captured (at point 439) and propagated through the synchronization latches 412 as the current value signal 429.

In some instances, however, the synchronization latches 412 may capture successive gray code values. For example, at point 441, the gray code value of two is captured by the latches 412 following the gray code value of one. However, the next gray code value captured (at point 443) is a digital one such that the current value signal 429 missed or failed to capture two successive values, namely the value of three 442 and the value of zero 444. As should be appreciated, the capturing of the gray code values and the number of successive values between captured values is dependent on the frequencies that the core clock and the reference clock operate. In general, the faster the reference clock frequency in comparison to the core clock frequency, the more successive values between captured values may be missed. The number of missed values, however, are accounted for by the constant timer signal circuit 400.

Also included in the timing diagram 421 is a last value signal 431. Similar to the above embodiments, the last value signal 431 is simply the current value signal 429 delayed by one core clock cycle. The last value signal 431 may be taken at node 418 of the circuit 400 and is provided as a second input 426 to the logic unit 422.

As described above, the logic unit 422 determines the difference between the current value signal 429 and the last value signal 431. In other words, the logic unit 422 determines how many gray code values are missed between captured values at the synchronization latches 412. As explained above, any number of gray code values may be missed between captured values based on the disparity between the frequencies of the core clock signal 425 and the reference clock signal 423. By calculating the difference between the current value signal 429 and the last value signal 431, the number of missed values is determined. Further, the calculated difference is provided as multiplexer control signal 433.

As shown in FIG. 4C, the multiplexer control signal 433 indicates that the difference between the current value and the second value is two in a first cycle, the difference between the current value and the second value is two in a second cycle, the difference between the current value and the second value is one in a third cycle, and so on.

As shown in the circuit 400 of FIG. 4A and timing diagram 421, the multiplexer controller signal (406, 433) is transmitted to the multiplexer 408 as a selector signal that selects which input of the multiplexer is latched in the counter latch 454. In particular, a digital value of zero on the selector signal 406 selects the value at input 460, a digital value of one selects the value at input 464, a digital value of two selects the value at input 468 and a digital value of three selects the value at input 482. Returning to the timing diagram 421 of FIG. 4C, a constant timer signal 435 is shown that is incremented by the multiplexer control signal 433. More particularly, the value of the multiplexer control signal 433 selects which input of the multiplexer 408 is selected. Also, as shown in FIG. 4A, each input to the multiplexer 408 is a multiple of a normalizing value. By selecting which multiple of the normalizing value is input into the counting latch 454, the multiplexer control signal 433 accounts for the missed gray code values. For example, the multiplexer control signal 433 may indicate that there is a difference of two values between the current value signal 429 and the last value signal 431 by providing a value of two on the multiplexer control signal. In this example, the multiplexer would then select the value at input 468 that includes a +2 normalization factor. This normalization factor accounts for the missed value in the gray code and normalizes the timer signal 435 properly. In a similar manner, a multiplexer control signal 433 providing a value of three on the multiplexer control signal would select the value at input 482 that includes a +3 normalization factor while a multiplexer control signal 433 providing a value of zero on the multiplexer control signal would select the value at input 460 that does not increment the timer signal 452. Thus, a timer signal with a constant frequency is created that may then be utilized by the computing system for timing purposes of one or more software programs.

It should be appreciated that the circuit 400 may be expanded to accommodate any difference in frequencies between the reference clock signal and the core clock signal. For example, the gray code may be any number of bits, such as a 4-bit gray code to account for a larger number of missed gray code values in the case where the reference clock frequency is much faster than the core clock frequency. In such an embodiment, the multiplexer may be configured to select from 16 inputs, with each input including a normalization factor that accounts for the missed gray code values. In this manner, any difference in frequencies between the reference clock signal and the core clock signal may be accounted for by the circuit. Further, it should be appreciated that the circuit 400 provides the constant timer signal regardless of if the core clock signal is faster or slower than the reference clock signal, with no changes in mode or structure to the circuit. Also, the circuit 400 operates to provide the constant timer signal during transitions of the frequency of the core clock signal, such as for power saving purposes. Thus, if a core clock signal is slowed to save power for the computing system, the circuit 400 continues to provide the constant timer signal accurately.

Figure 5A:
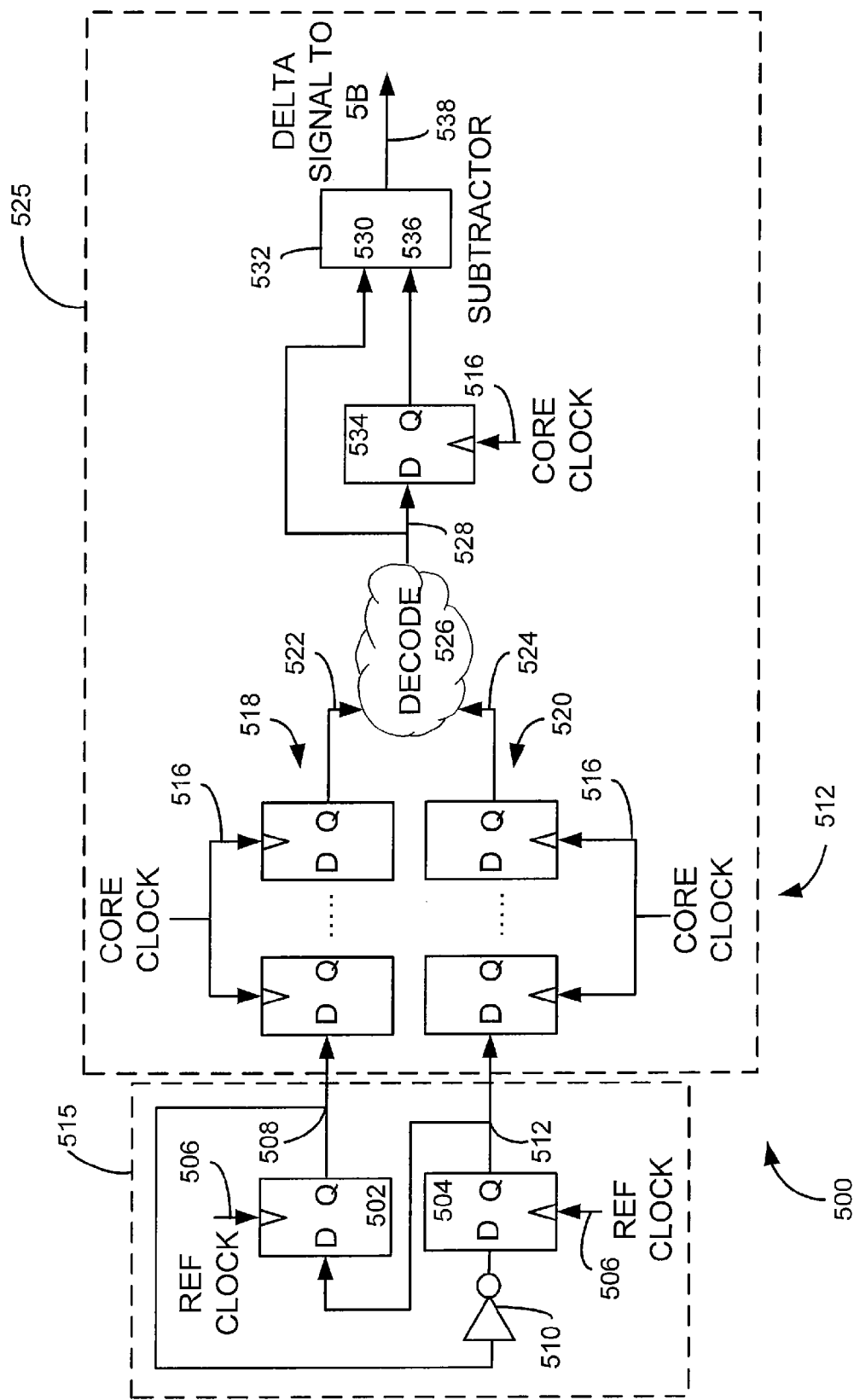
FIG. 5A is a first portion of a second embodiment of a circuit diagram illustrating the utilization of a reference clock of a computing system and a gray code to provide a constant frequency timer for use by the microprocessor that includes varying core clock signal.

FIG. 5A is a circuit diagram illustrating one particular implementation of the gray code portion 470 and synchronization portion 410 of the circuit 400 of FIG. 4A. The circuit diagram 500 of FIG. 5A is but one possible implementation of the circuit portions of the circuit described in relation to FIG. 4A. Other components and connections may also be utilized to perform the circuit functions described above.

As shown in FIG. 5A, the gray code portion 515 of the circuit 500 includes a gray code first bit latch 502 and a gray code second bit latch 504. Each latch (502, 504) includes an input D and an output Q. In addition, each latch (502, 504) is paced by a reference clock signal 506. The output Q of the gray code first bit latch 502 is electrically connected to an input of an inverter 510, with the output of the inverter electrically connected to the input D of the gray code second bit latch 504. The output Q of the gray code second bit latch 504 is electrically connected to the input D of the gray code first bit latch 502. In this manner, a gray code first bit is provided at node 508 and a gray code second bit is provided at node 512. In addition, at each reference clock cycle, only one bit of the gray code is changed. A table summarizing one possible gray code as converted to a base-two binary value is provided below in Table 1.

TABLE 1

| First Gray Code Bit | Second Gray Code Bit | Value |
| --- | --- | --- |
| 0 | 0 | 0 |
| 0 | 1 | 1 |
| 1 | 1 | 2 |
| 1 | 0 | 3 |

The synchronizer portion 525 of the circuit 500 includes a series of synchronizing latches 514 paced by a core clock signal 516. Each of the synchronizing latches 514 include an input D and an output Q connected in series such that the output of the first latch is connected to the input of the second latch, and so on. In addition, the synchronizing latches 514 include a first set of latches 518 for synchronizing the gray code first bit to the core clock signal 516 and a second set of latches 520 for synchronizing the gray code second bit to the core clock signal. As mentioned above, any number of synchronizing latches 514 may be utilized in the circuit 500 to delay and synchronize the gray code bits to the core clock signal 516.

The output 522 of the last latch in the first set of latches 518 and the output 524 of the last latch in the second set of latches 520 are provided to a decoding unit. The decoding unit 526 is configured to decode the received gray code bits into a value for processing by the circuit. For example, the decoding unit 526 may receive the gray code bits and provide a value as illustrated in Table 1 above. In general, the decoding unit 526 may include a group of hardware components, such as a group of logic gates, or may be software. Regardless of the composition, the decoding unit 526 provides a value, expressed in one or more digital bits, to node 528 of the circuit 500.

Node 528 is electrically connected to a first input 530 of a subtractor unit 532. Node 528 is also electrically connected to an input to a delay latch 534 that is paced by the core clock signal 516. The output of the delay latch 534 is electrically connected to a second input 536 of the subtractor unit 532. In general, the subtractor unit 532 is configured to calculate a difference between the value at the first input 530 and the value at the second input 536 and provide that calculated difference as an output 538. Similar to the decoding unit 526, the substractor unit 532 may be implemented through a group of hardware components, such as a group of logic gates, or through a software program. Further, the subtractor unit 532 may be configured to provide the calculated difference, or delta, as provided in Table 2 below.

TABLE 2

| Value at First Input | Value at Second Input | Calculated Difference |
|---|---|---|
| 0 | 0 | 0 |
| 1 | 0 | 1 |
| 2 | 0 | 2 |
| 3 | 0 | 3 |
| 0 | 1 | 3 |
| 1 | 1 | 0 |
| 2 | 1 | 1 |
| 3 | 1 | 2 |
| 0 | 2 | 2 |
| 1 | 2 | 3 |
| 2 | 2 | 0 |
| 3 | 2 | 1 |
| 0 | 3 | 1 |
| 1 | 3 | 2 |
| 2 | 3 | 3 |
| 3 | 3 | 0 |

Note that, because the gray code values repeat the sequence of zero through three, the subtraction unit 532 may account for the values wrapping around the sequence. For example, if the value at the first input 530 (which represents a current value of the gray code) is zero and the value at the second input 536 (which represents a previous value of the gray code) is one, then the calculated delta is three. This is because the current value (zero) is three increments from the previous value (one). More particularly, the gray code in this example began at one (represented as the previous value), incremented through the values of two and three before returning to zero (represented as the current value), resulting in a delta of three, or three increments between the values provided. In one embodiment, this calculation may be obtained by adding the value at the first input (the current value) to the two's complement of the value at the second input (the previous value).

Figure 5B:
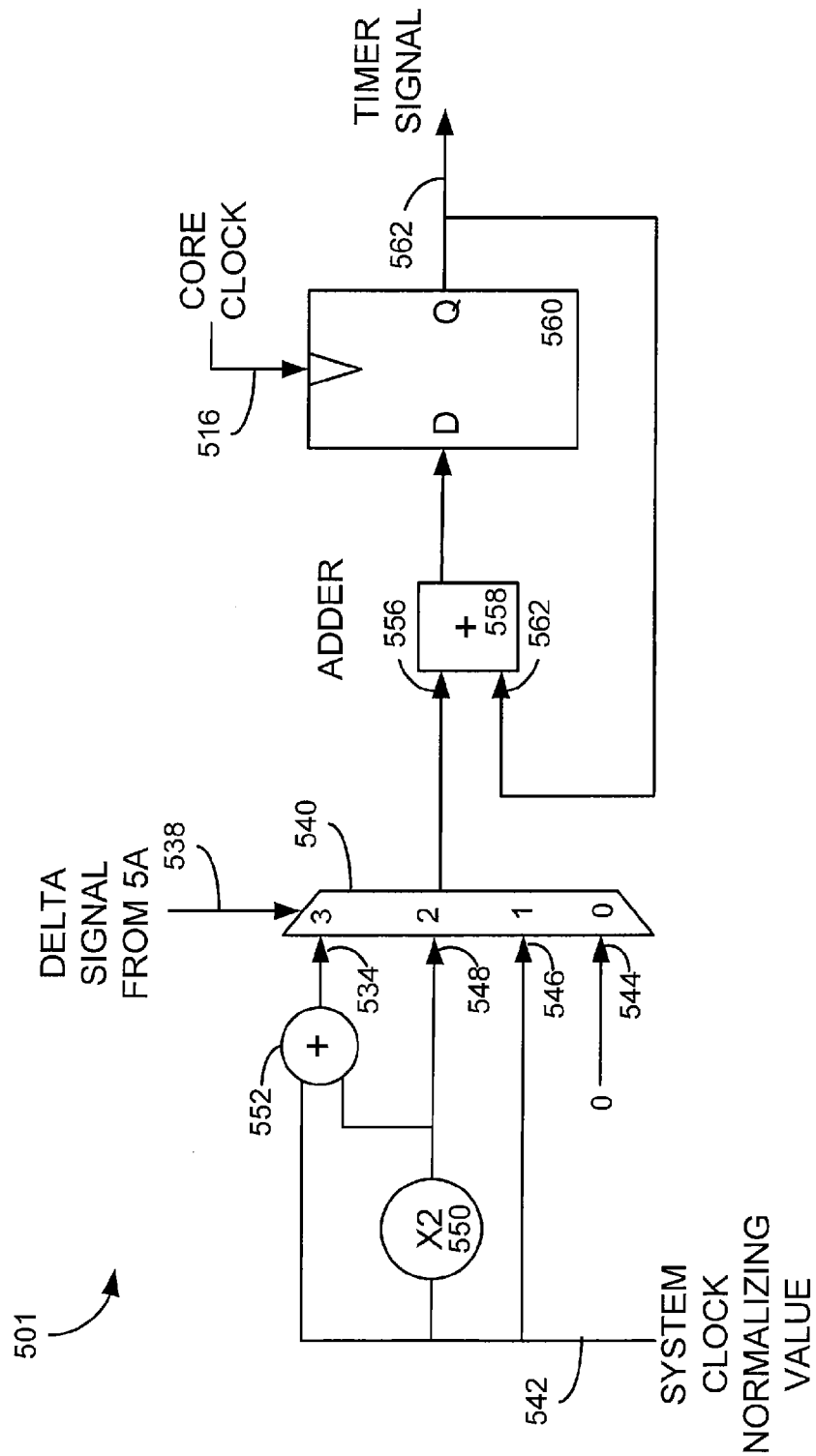
FIG. 5B is a second portion of the second embodiment of a circuit diagram of FIG. 5A illustrating the utilization of a reference clock of a computing system and a gray code to provide a constant frequency timer for use by the microprocessor that includes varying core clock signal.

The calculated difference or delta signal 538 is transmitted to other portions of the circuit 500. More particularly, the delta signal 538 is provided to the circuit portions illustrated in FIG. 5B. FIG. 5B is a circuit diagram 501 illustrating one particular implementation of the counter portion 450 of the circuit 400 of FIG. 4A. The delta signal 538 generated by the circuit portions of FIG. 5A is transmitted to a multiplexer 540 as a selector signal to select from a plurality of inputs to the multiplexer. In particular, the multiplexer 540 has four inputs, with the value of the selector signal 538 selecting which of the four inputs is passed by the multiplexer. Each input to the multiplexer 540 is some multiple of a system clock normalizing value 542, referred to herein as N. Thus, the selector signal or delta signal 538 selects which multiple of N is passed through the multiplexer 540.

A first input 544 to the multiplexer 540 that is selected when the delta signal 538 is a value zero includes a zero value. A second input 546 to the multiplexer 540 that is selected when the delta signal 538 is a value one includes the value N on the system clock normalizing value line. A third input 548 to the multiplexer 540 that is selected when the delta signal 538 is a value two includes the value N multiplied by 2 at multiplier 550, or the value 2N. Also, the value 2N may be added to the value N at adder 552 to provide a 3N value at a fourth input 554 to the multiplexer 540. This 3N value is selected when the delta signal 538 is a value three. In this manner, the delta signal 538 selects which multiple of N is provided by the multiplexer 540. In addition, the output of the multiplexer 540 is provided as a first input 556 to adder 558.

The circuit of FIG. 5B also includes a counter latch 560. The counter latch 560 includes an input D, an output Q and is paced by the core clock signal 516. The output 562 of the counter latch 560 is the constant timer signal utilized by the computing device for timing executing software programs. The output 562 is also electrically connected to a second input 562 to adder 558. In operation, adder 558 adds the selected multiple of value N to the value stored in the counter latch 560 and stores the calculated value in the counter latch. Thus, if the zero input 544 of the multiplexer 540 is selected, a zero is added to the constant timer signal 562 and stored in the counter latch 560. However, any other selector signal 538 provided to the multiplexer 540 would add a multiple of N value to the constant timer signal 562 to increment the timer signal, as explained above. In this manner, the circuits of FIGS. 5A and 5B are one embodiment of the constant timer signal circuit described herein.

Figure 6:
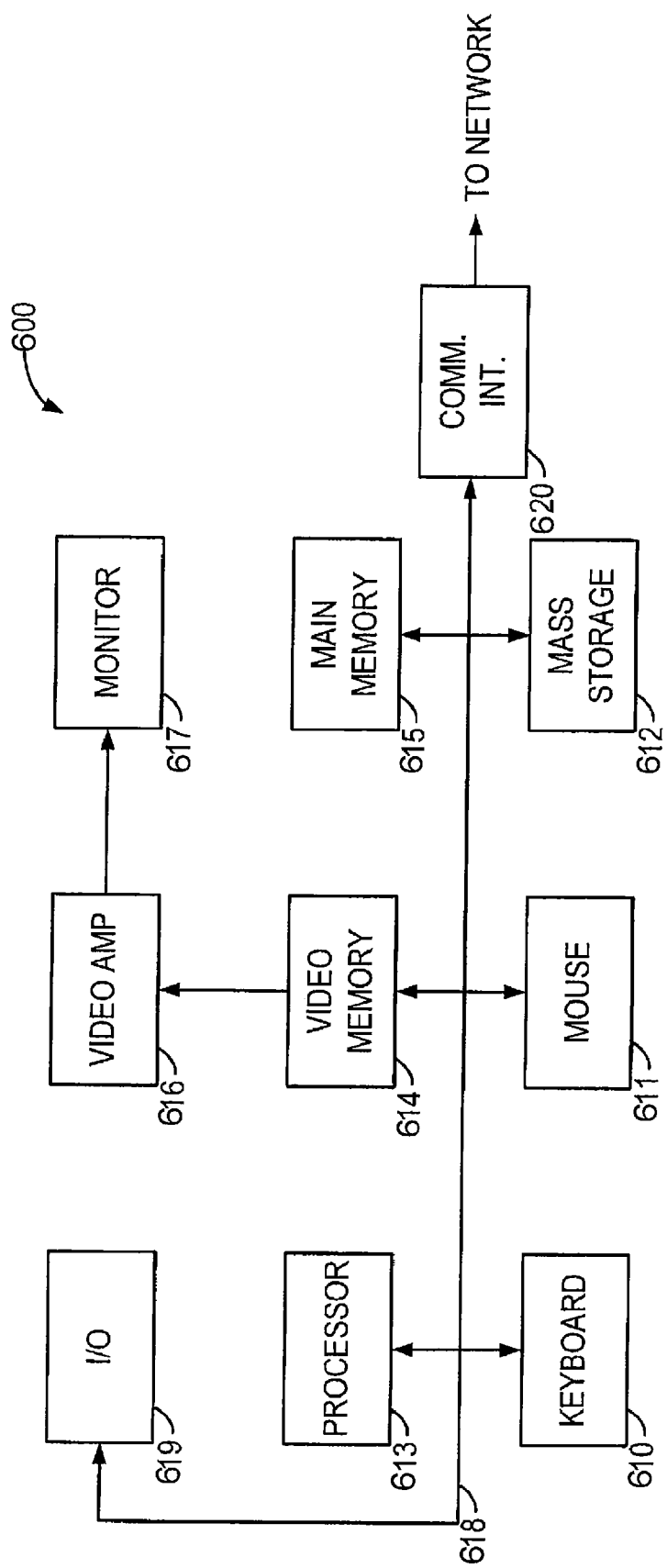
FIG. 6 is a block diagram illustrating an example of a computing system which may be used in implementing embodiments of the present disclosure.

FIG. 6 illustrates a computer system 600 capable of implementing the embodiments described herein. In some embodiments, the computer system 600 may include a microprocessor that incorporates one or more of the embodiments described herein. For example, the computer system 600 may be a personal computer and/or a handheld electronic device. A keyboard 610 and mouse 611 may be coupled to the computer system 600 via a system bus 618. The keyboard 610 and the mouse 611, in one example, may introduce user input to the computer system 600 and communicate that user input to a processor 613. Other suitable input devices may be used in addition to, or in place of, the mouse 611 and the keyboard 610. An input/output unit 619 (I/O) coupled to system bus 618 represents such I/O elements as a printer, audio/video (A/V) I/O, etc.

Computer 600 also may include a video memory 614, a main memory 615 and a mass storage 612, all coupled to the system bus 618 along with the keyboard 610, the mouse 611 and the processor 613. The mass storage 612 may include both fixed and removable media, such as magnetic, optical or magnetic optical storage systems and any other available mass storage technology. The bus 118 may contain, for example, address lines for addressing the video memory 114 or the main memory 115. In some embodiments, the main memory 115 is a fully buffered dual inline memory module (FB-DIMM) that communicates serially with other system components.

The system bus 618 also may include a data bus for transferring data between and among the components, such as the processor 613, the main memory 615, the video memory 614 and the mass storage 612. The video memory 614 may be a dual-ported video random access memory. One port of the video memory 614, in one example, is coupled to a video amplifier 616, which is used to drive a monitor 617. The monitor 617 may be any type of monitor suitable for displaying graphic images, such as a cathode ray tube monitor (CRT), flat panel, or liquid crystal display (LCD) monitor or any other suitable data presentation device.

In some embodiments, the processor 613 is a SPARC® microprocessor from Sun Microsystems, Inc, although any other suitable microprocessor or microcomputer may be utilized. The processor 613 are described in more detail above with regard to FIGS. 1-5B.

The computer system 600 also may include a communication interface 620 coupled to the bus 618. The communication interface 620 provides a two-way data communication coupling via a network link. For example, the communication interface 620 may be a local area network (LAN) card, or a cable modem, and/or wireless interface. In any such implementation, the communication interface 620 sends and receives electrical, electromagnetic or optical signals which carry digital data streams representing various types of information.

Code received by the computer system 600 may be executed by the processor 613 as it is received, and/or stored in the mass storage 612, or other non-volatile storage for later execution. In this manner, the computer system 600 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for generating a timer signal in a microprocessor, the method comprising:
   generating a reference code, the reference code configured to increment based on a reference clock signal;
   calculating a difference between a first value of the reference code and a second value of the reference code, the second value of the reference code occurring after the first value of the reference code;
   selecting from a plurality of inputs to a multiplexer based at least on the calculated difference between the first value of the reference code and the second value of the reference code; and
   incrementing a recursive timer signal based at least on the selected input to the multiplexer;
   wherein a timer signal circuit configured to increment the recursive timer signal based at least on the selected input to the multiplexer comprises:
     the multiplexer comprising a plurality of inputs and an output;
     a counter latch comprising an input and an output;
     a first adder comprising a first input electrically connected to output of the multiplexer, a second input electrically connected to the output of the counter latch and an output electrically connected to the input of the counter latch;
     a multiplier comprising an input and an output, the multiplier configured to multiply a value on the input by two; and
     a second adder comprising a first input, a second input and an output.

2. The method of claim 1 further comprising:
   synchronizing the reference code to a core clock signal by transmitting the reference code to at least one latch device, wherein the at least one latch device is clocked with the core clock signal.

3. The method of claim 2 wherein the second value of the reference code occurs one core clock cycle after the first value of the reference code.

4. The method of claim 2 wherein a frequency of the reference clock signal is greater than a frequency of the core clock signal.

5. The method of claim 4 wherein the frequency of the core clock signal transitions from less than a frequency of the reference clock signal to greater than the frequency of the reference clock signal.

6. The method of claim 1 further comprising:
   adjusting the recursive timer signal by a multiple of a normalization value; and
   wherein a first input of the plurality of inputs to the multiplexer includes the recursive timer signal adjusted by a first multiple of the normalization value and a second input of the plurality of inputs to the multiplexer includes the recursive timer signal adjusted by a second multiple of the normalization value.

7. The method of claim 6 wherein the first input of the plurality of inputs to the multiplexer includes the recursive timer signal, the second input of the plurality of inputs to the multiplexer includes the recursive timer signal adjusted by the normalization value, a third input of the plurality of inputs to the multiplexer includes the recursive timer signal adjusted by twice the normalization value and a fourth input of the plurality of inputs to the multiplexer includes the recursive timer signal adjusted by three times the normalization value.

8. The method of claim 1 wherein the reference code is a two-bit gray code.

9. The method of claim 1 wherein the calculating operation further comprises:
   transmitting the first value of the reference code to a first input of a logic unit; and
   transmitting the second value of the reference code to a second input of the logic unit;
   wherein the logic unit is configured to calculate the difference between the first value of the reference code at the first input of a logic unit and the second value of the reference code at the second input of a logic unit and output the calculated difference.

10. A circuit for generating a timer signal in a microprocessor, the circuit comprising:
    a code generating portion configured to generate a reference code based on reference clock signal;
    a synchronization portion configured to generate a selector signal for a multiplexer, the selector signal based at least on a calculated difference between a first value of the reference code and a second value of the reference code and wherein the synchronization portion is clocked by a core clock signal; and
    a timer signal generating portion configured to input the selector signal for the multiplexer, increment a recursive timer signal based at least on the selected input to the multiplexer and output the incremented recursive timer signal
    wherein the timer signal generating portion comprises:
      a multiplexer device comprising a plurality of inputs and an output;
      a counter latch comprising an input and an output;
      a first adder comprising a first input electrically connected to output of the multiplexer, a second input electrically connected to the output of the counter latch and an output electrically connected to the input of the counter latch;
      a multiplier comprising an input and an output, the multiplier configured to multiply a value on the input by two; and
      a second adder comprising a first input, a second input and an output.

11. The circuit of claim 10 wherein the code generating portion comprises:
   at least one code generating latch device comprising an input and an output; and
   an incrementing device comprising an input and an output;
   wherein the output of the at least one code generating latch device is electrically connected to the input of the incrementing device and the output of the incrementing device is electrically connected to the input of the at least one code generating latch device.

12. The circuit of claim 10 wherein the synchronization portion comprises:
   a plurality of synchronization latches connected in series, wherein each latch of the plurality of synchronization latches is clocked by the core clock signal; and
   a logic unit comprising a first input, a second input and an output, the logic unit configured to calculate a difference between a first value at the first input and a second value at the second input and output the calculated difference.

13. The circuit of claim 12 wherein the synchronization portion further comprises:
   a delay latch comprising an input and an output, the input electrically connected to an output of the series of the plurality of synchronization latches and the output is electrically connected to the second input of the logic unit.

14. The circuit of claim 13 wherein the delay latch is clocked by the core clock signal and is configured to delay a value at the input of the delay latch by one core clock cycle.

15. The circuit of claim 12 wherein the logic unit is a software program configured to calculate the difference between the first value and the second value and output the calculated difference.

16. The circuit of claim 10 wherein the plurality of inputs of the multiplexer device comprise:
   a first input electrically connected to digital zero;
   a second input electrically connected to a normalizing value generator;
   a third input electrically connected to the output of the multiplier; and
   a fourth input electrically connected to the output of the second adder;
   wherein the first input of the second adder is electrically connected to the normalizing value generator and the second input of the second adder is electrically connected to the output of the multiplier.

17. The circuit of claim 10 wherein a core clock frequency is less than a reference clock frequency.

18. The circuit of claim 10 wherein the code generating portion comprises:
   a first code bit latch comprising an input and an output that provides the first code bit, the first code bit latch clocked by the reference clock signal;
   a second code bit latch comprising an input and an output that provides the second code bit, the second code bit latch clocked by the reference clock signal; and
   an inverter comprising an input and an output;
   wherein the output of the first code bit latch is electrically connected to the input of the inverter, the output of the inverter is electrically connected to the input of the second code bit latch and the output of the second code bit latch is electrically connected to the input of the first code bit latch.

* * * * *